United States Patent Office 3,177,200
Patented Apr. 6, 1965

3,177,200
PROCESS FOR THE MANUFACTURE OF CARDIOACTIVE MONOGLYCOSIDES
Kuno Meyer, Basel, Switzerland, assignor to Hoffmann-La Roche Inc., Nutley, N.J., a corporation of New Jersey
No Drawing. Filed July 31, 1963, Ser. No. 299,108
Claims priority, application Switzerland, Aug. 10, 1962, 9,607/62
2 Claims. (Cl. 260—210.5)

The present invention relates to cardioactive monoglycosides, and more particularly, to cardioactive monoglycosides and to a process for their preparation.

The process of the invention is carried out by fermentatively degrading the diglycosides extracted from *Digitalis canariensis* L. in the form of a mixture to the corresponding monosides and, if desired, separating the resulting monoside mixture into its components.

*Digitalis canariensis* L. (Canary foxglove) is a kind of Digitalis indigenous to the Canary Islands. Together with the *Digitalis isabelliana* (*Digitalis canariensis* L. var. *isabelliana*), which is only found in the Grand Canary Island, it forms the subgenus Isoplexis which distinguishes itself from the other herbal kinds of Digitalis (subgenus Eudigitalis) by its shrub-like growth and by evergreen leaves.

*Digitalis canariensis* L. is characterized by a high content of cardiac glycosides. This content is, on average, 10 times higher than with *Digitalis purpurea*.

It has now been discovered that the predominant glycoside of *Digitalis canariensis* L. is based upon a hitherto unknown aglycone which has been named canarigenin and has the following formula

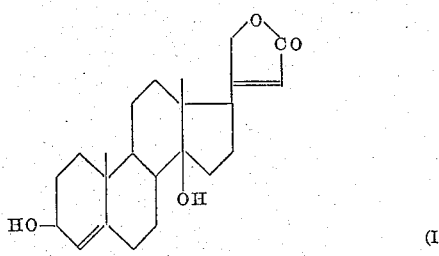

(I)

In this predominant glycoside, the above aglycone [$\Delta^4$-3$\beta$,14-dihydroxy-card-20(22)-enolide] is linked with digitoxose which, in turn, is bound to glucose.

The glycoside mixture used as a starting material in the practice of the process of the invention can be obtained by known methods; for example, in accordance with the extraction process described in Helv. Chim. Acta, 1959, 42, 1014. This extraction process can be carried out by exhaustively extracting the drug-containing material, especially the dried leaves of *Digitalis canariensis* L. with an aqueous alkanol, eg., methanol or ethanol, and/or an anhydrous alkanol, precipitating the accompanying materials from the extract obtained by means of basic lead acetate; and finally undertaking a distribution of the extract between the aqueous phase and different organic solvents—for example, in the sequence ether, chloroform, chloroform/ethanol (4:1), chloroform/ethanol (2:1) and chloroform/ethanol (3:2). By this procedure most of the cardioactive content passes into the chloroform/ethanol (4:1) extract. The glycoside mixture contained in this extract accordingly represents a preferred starting material. However, the glycoside mixture which is found in the aqueous phase after the extraction with ether and chloroform only can also be used as the starting material.

The fermentative degradation of the diglycosides (biosides) contained in the glycoside mixture to the corresponding monoglycosides (monosides) is carried out by the use of enzymes which effect the splitting off of the terminal glucose from the bioside molecule. Such enzymes are, by way of example, digilanidase (from *Digitalis lanata*), digipurpidase (from *Digitalis purpurea*), scillarenase (from *Scilla maritima*), takadiastase (from *Aspergillus oryzae*), glucosidases from yeast or from hepatopancreas juice, etc. Generally, the fermentation is effected at a pH of about 6, at a temperature in the range of about 35° to 40° C. and in the presence of a water-miscible solvent.

Strophanthobiase (see, for example, Enzymologia, 1939, 7, 362) is an excellent ferment for use in the practice of the invention. About 0.5 to about 2 parts of strophanthobiase are conveniently used to each part of glycoside mixture. The fermentative degradation can be undertaken in aqueous solution, if desired, with the addition of a water-miscible solvent, for example, a ketone (such as acetone), an ether (such as dioxan, methyl Cellosolve), a lower alkanol (such as methanol, ethanol), etc. The duration of the fermentation is in the range of about 5 to about 20 days at a temperature of about 37° C. Moreover, it is to be noted that certain ferments (such as, for example, strophanthobiase) are capable of splitting not only the terminal glucose residue but also the sugar component which is directly attached to the aglycone. If desired, non-fermented material obtained can be subjected to a refermentation, but, in general, this is not worthwhile. The monosides formed by the fermentative degradation can be separated from unchanged starting material by removing them by shaking with a suitable solvent, for example, a halogenated aliphatic hydrocarbon such as chloroform, methylene chloride, etc.

As has been found, the canarigenin digitoxoside [sugar component: D(+)-digitoxose] predominates in the monoside mixture obtained.

This monoside has the following formula

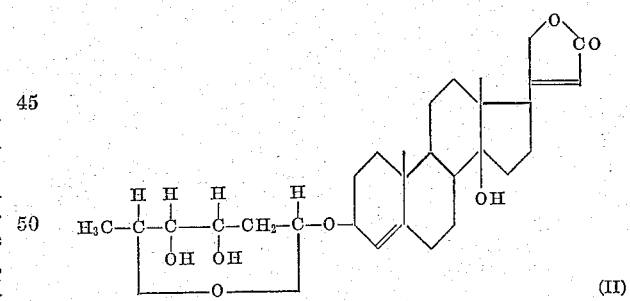

(II)

Other monosides present in the monoside mixture are canarigenin canaroside [sugar component: D(+)-canarose (2-desoxy-D-rhamnose)] having the formula

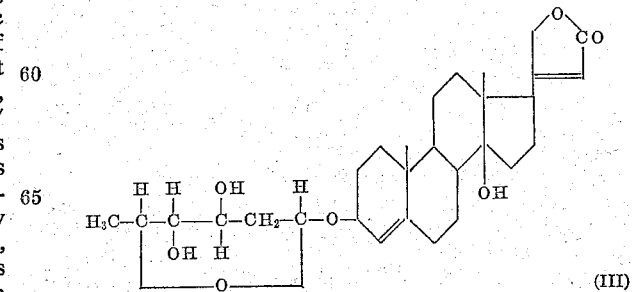

(III)

and xysmalogenin canaroside.

The sugar component, D(+)-canarose, is a novel compound, having the formula

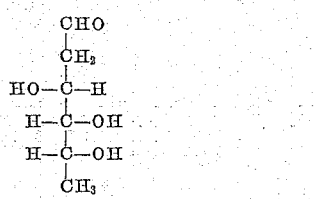

(IV)

D(+)-canarose is obtained from canarigenin canaroside by acid hydrolysis, e.g. by treatment with a warm solution of methanol/0.1 N sulfuric acid (1:1).

The separation of the obtained monoside mixture for the purpose of obtaining the individual monosides, especially the canarigenin-digitoxoside just mentioned, can be carried out, for example, by fractional crystallization, countercurrent distribution or, preferably, by chromatography (on $Al_2O_3$, silicagel, etc.) using, for example, benzene/chloroform mixtures, chloroform and chloroform/methanol as the eluents.

The monosides obtainable according to the process of the invention possess a strong cardiac action, and are useful as cardiac stimulants. They are particularly useful due to their low cumulation and low reabsorbability. Canarigenin is useful in the preparation of the above designated canarigenin monosides.

EXAMPLE 1

(a) *Fermentation.*—84 g. of a powdered glycoside mixture [obtained from leaves of *Digitalis canariensis* L. in the form of the chloroform/ethanol (4:1) extract] are dissolved in 1200 ml. of methanol/water (1:1) with gentle heating. A total of 600 ml. of methanol and 18 liters of warm water are added gradually and alternately to the honey-brown clear solution while rotating. The slightly opaque solution thus obtained is freed from methanol in a thin-layer evaporator at 50° in 80 portions each of around 250 ml. To the resulting turbid solution (volume 12 liters) is added, while stirring, a solution of 100 g. of crude strophanthobiase in 1000 ml. of water (dark-brown colored, opaque) is poured in in a fine jet. After the addition of 10–15 ml. of toluene, the fermentation is left to stand for 10 days at 37° with occasional agitation. Thereupon, a yellow-white spongy precipitate forms. This is isolated by filtration over a filter packed with Hyflo Supercel.

The filter cake is sucked dry, suspended in 150 ml. of methanol (while heating) and filtered off under suction. The yellow filtrate is brought to dryness in a vacuum. 5.6 g. of a yellow-white foam are obtained as the residue. This is partitioned between 25 ml. of water and 250 ml. of chloroform in a separatory funnel. After decanting off the chloroform, the aqueous phase is extracted a further 3 times, each time with 150 ml. of chloroform. After washing with water, drying over sodium sulfate and evaporating in a vacuum, the chloroform extracts give a total of 4.8 g. of monoside mixture. The aqueous solution (25 ml.) is extracted 3 times, each time with 150 ml. of chloroform/ethanol (2:1), 0.8 g. of starting material are thus recovered.

The fermentation solution freed from the precipitate (see above) is concentrated to 2 liters under reduced pressure at 50° and treated with 12 liters of 96 percent ethanol, heated to boiling on the steam-bath and thereafter filtered under suction through a filter packed with Hyflo. The clear yellow-colored filtrate (14 liters) is concentrated to 1500 ml. at 50° in a thin-layer evaporator, treated with 1500 ml. of water and concentrated to 1000 ml. in a rotation evaporator (strong foaming). Thereupon, an orange-brown viscous precipitate precipitates out. The solution and precipitate are extracted in a 3-liter separating funnel 10 times with 1000 ml. of chloroform each time. The chloroform extracts are then passed in succession through 2 separating funnels each containing 200 ml. of water and are then worked up as described above. 23.7 g. of a monoside mixture are obtained. The total quantity amounts to 28.5 g. (together with the monoside mixture isolated from the fermentation precipitates).

From the fermentation solution extracted with chloroform as previously described a total of 32 g. of unfermented material can be recovered by extraction with a chloroform/ethanol (4:1) mixture. Refermentation is not worthwhile.

(b) *Chromatographic separation of the monoside mixture.*—28 g. of the monoside mixture obtained are chromatographed on 600 g. of $Al_2O_3$. The following table gives information concerning the procedure and the results achieved:

Table

| Fraction number | Solvent (500 ml.) for each fraction | Isolated substance Amount (crude) in mg. | Composition (thin-layer chromatography) |
|---|---|---|---|
| 1–5 | Benzene-Chlf. (4:1) | 125 | |
| 6–7 | Benzene-Chlf. (3:2) | 160 | |
| 8–9 | Benzene-Chlf. (3:2) | 150 | a |
| 10–11 | Benzene-Chlf. (3:7) | 195 | a, b, c |
| 12 | Benzene-Chlf. (3:7) | 655 | b, c |
| 13–15 | Chloroform | 1,100 | b, c, (d) |
| 16–17 | do | 1,030 | b, (c), d |
| 18–35 | do | 10,445 | d |
| 36–40 | Chlf.-Me (99.5:0.5) | 645 | d, e |
| 41–47 | Chlf.-Me (99:1) | 1,665 | e, f, g |
| 48–56 | Chlf.-Me (49:1) | 2,030 | e, f, g |
| 57–67 | Chlf.-Me (19:1) | 4,500 | e, f, g |
| 68–72 | Chlf.-Me (9:1) | 435 | e, f, g |
| 73–77 | Chlf.-Me (7:3) | 130 | e, f, g |

Chlf.: Chloroform.
Me: Methanol.
a: Canarigenin 3-methyl ether.
b: Canarigenin.
c: 3-epi-canarigenin.
d: Canarigenin-digitoxoside.
e: Mixture of monosides consisting of canarigenin canaroside and xysmalogenin canaroside.
f, g: Non-identified monosides.

7.75 g. of pure canarigenin-digitoxoside and a further 1.3 g. of canarigenin-digitoxoside containing some monosides are obtained from fractions 18–35.

Properties of the pure canarigenin-digitoxoside: fine small needles (containing water) of melting point 176–201° C. from acetone/ether; prismatic plates (solvent-free) of melting point 135–142° C. (from methanol/ether);

$$[\alpha]_D^{22} = -11.4° \pm 2°$$

(in chloroform). The acetyl compound, obtainable in the form of very fine small needles, melts at 212–225° C. (from acetone); $[\alpha]_D^{22} = +4.2° \pm 2°$ (in chloroform).

If the canarigenin-digitoxoside is subjected to hydrolysis according to methods commonly used for the splitting of 2-desoxy-sugar glycosides [heating on the steam bath for 30 minutes in methanol/(0.1-N sulfuric acid) (1:1)] then one molecule of water is eliminated from the genuine aglycone (canarigenin) and the 3,5-dianhydro-periplogenin is obtained as the aglycone.

The splitting of canarigenin-digitoxoside with methanol/water and 1 percent glacial acetic (37° C., left standing for 8–10 days) yields, in the main, the canarigenin 3-methyl ether of melting point 212–222° C.;

$$[\alpha]_D^{20} = +27.6° \pm 2°$$

(in chloroform).

The splitting of canarigenin-digitoxoside with acetone/water (1:1) and 1 percent glacial acetic (37° C., left standing for 8–10 days) yields, as the main product, canarigenin besides 3-epi-canarigenin (α-position of the 3-hydroxyl group) of melting point 207–215° C.;

$$[\alpha]_D^{22} = +105° \pm 2°$$

(in chloroform) and 3,5-dianhydro-periplogenin. From the formation of 3-epi-carnarigenin it follows that inversion at $C_3$ of the aglycone can occur with splitting.

The aglycone, canarigenin, forms prismatic plates from chloroform/methanol/acetone. Melting point 235–252° C.; $[\alpha]_D^{22} = +22° \pm 2°$ (in methanol). The acetyl-canarigenin melts at 214–217° C.; $[\alpha]_D^{20} = -4° \pm 2°$ (in chloroform). Cautious dehydrogenation of canarigenin leads to anhydro-periplogenone.

The product designated as "e" (see the above table), present in fractions 36–77, is a chromatographically uniform mixture of two isomeric monosides both containing the same sugar component, viz. D(+)-canarose(2-desoxy-D-rhamnose). The aglycones are canarigenin and xysmalogenin, respectively. Accordingly, the product designated as "e" is a mixture of canarigenin-D(+)-canaroside and xysmalogenin-D(+)-canaroside. The mixture has the double melting point 150–155°/218–235° (from methanol), $[\alpha]_D^{24} = -31.8 \pm 2°$ (in chloroform). Melting point of the acetyl derivative of the monoside mixture 265–270° C.; $[\alpha]_D^{22} = -21° \pm 2°$ (in chloroform).

(c) *Obtaining the starting material.*—1200 g. of air-dried leaves of *Digitalis canariensis* L., which have been ground as fine as dust, in a ball-mill, are well worked through with 2 liters of warm water, thereafter treated with 2 liters of ethanol at 60° C. Then the whole is filtered while still warm over a filter packed with Hyflo Supercel and the residue is extracted in the same manner yet 6 times, each time with 2 liters of ethanol. The combined extracts are concentrated in a vacuum at 50° (bath temperature) to a total volume of about 1.2 liters. After the addition of about 1.2 liters of water, the about 50 percent ethanol solution is shaken on a machine for 30 minutes with $Pb(OH)_2$ (freshly prepared from 1.2 kg. of lead diacetate trihydrate and washed until neutral), filtered under suction through a filter packed with Hyflo Supercel, the residue made into a paste with 500 ml. of 50 percent ethanol, again filtered off under suction and rewashed with a little 50 percent ethanol. The filtrate only just gives a slight turbidity with aqueous lead acetate solution. It is adjusted to pH 6 with 2-N sulfuric acid and concentrated to 1 liter while maintaining a pH of about 6. This solution is extracted in a separating funnel 4 times, each time with 2 liters of ether, then 4 times, each time with 1 liter of chloroform, 8 times, each time with 1 liter of chloroform/ethanol (4:1),3 times, each time with 1 liter of chloroform/ethanol (2:1) and finally a further 3 times, each time with 1 liter of chloroform/ethanol (3:2). All extracts are passed in succession through two shaking funnels, each containing 150 ml. of water (the ether extracts alone are additionally washed with dilute soda solution) and are dried over sodium sulfate, then filtered and evaporated under vacuum.

On an average, there are obtained from 1 kg. of leaf-powder the following quantities of material:

|  | G. |
|---|---|
| Ether extract | 3 |
| Chloroform extract | 3 |
| Chloroform/ethanol (4:1) extract | 37.5 |
| Chloroform/ethanol (2:1) extract | 3.75 |
| Chloroform/ethanol (3:2) extract | 4.5 |

The glycoside mixture extracted with chloroform/ethanol (4:1) is used as the starting material.

I claim:

1. Canarigenin-D(+)-digitoxoside having the formula

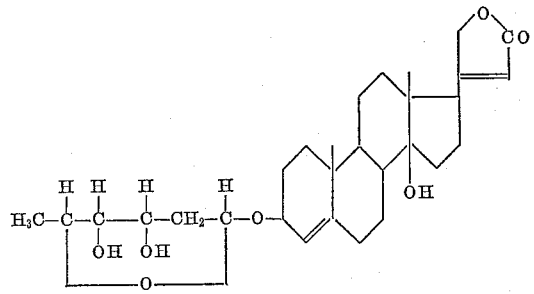

2. Canarigenin, having the formula

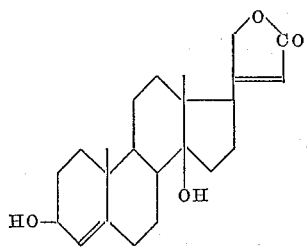

References Cited by the Examiner

UNITED STATES PATENTS 2,179,204  11/39  Stoll et al. _____ 260—210.5
2,752,372  6/56  Reichstein _____ 260—210.5

OTHER REFERENCES

Studer et al.: Helv. Chem. Acta., vol. XLVI, Feb. 1, 1963, pp. 23–45.

LEWIS GOTTS, *Primary Examiner.*